(12) United States Patent
Yurecko

(10) Patent No.: US 10,888,080 B2
(45) Date of Patent: Jan. 12, 2021

(54) ADJUSTABLE FLY LURE TYING APPARATUS

(71) Applicant: John Yurecko, Monmouth JCT, NJ (US)

(72) Inventor: John Yurecko, Monmouth JCT, NJ (US)

(*) Notice: Subject to any disclaimer, the term of this patent is extended or adjusted under 35 U.S.C. 154(b) by 186 days.

(21) Appl. No.: 15/666,216

(22) Filed: Aug. 1, 2017

(65) Prior Publication Data

US 2019/0037826 A1    Feb. 7, 2019

(51) Int. Cl.
*A01K 97/26* (2006.01)
*A01K 97/28* (2006.01)
*A01K 97/06* (2006.01)

(52) U.S. Cl.
CPC ............ *A01K 97/28* (2013.01); *A01K 97/06* (2013.01); *A01K 97/26* (2013.01)

(58) Field of Classification Search
CPC ................................. A01K 97/26; A01K 97/28
USPC ........................................... 43/4, 42.53
See application file for complete search history.

(56) References Cited

U.S. PATENT DOCUMENTS

| | | | | |
|---|---|---|---|---|
| 2,332,655 A * | 10/1943 | Miles | A01K 97/28 | 242/441.1 |
| 4,134,577 A * | 1/1979 | Price | A01K 97/28 | 269/101 |
| 4,184,645 A * | 1/1980 | Starling | A01K 97/28 | 242/441 |
| 4,573,719 A * | 3/1986 | Aldridge | A01K 91/04 | 223/99 |
| 5,169,079 A * | 12/1992 | Renzetti | A01K 97/28 | 242/446 |
| 6,119,972 A * | 9/2000 | Vogel | A01K 97/28 | 242/443 |
| 6,126,157 A * | 10/2000 | Rutzer | A01K 97/28 | 269/239 |
| 6,364,304 B1 * | 4/2002 | Strait | A01K 97/28 | 269/131 |
| 7,232,119 B2 * | 6/2007 | Yonenoi | A01K 97/28 | 269/71 |
| 7,566,022 B1 * | 7/2009 | McKinley | A01K 97/28 | 242/443 |
| 7,950,638 B2 * | 5/2011 | Su | A01K 97/28 | 269/71 |
| 9,737,064 B2 * | 8/2017 | Durrant | A01K 97/28 | |

* cited by examiner

*Primary Examiner* — David J Parsley
(74) *Attorney, Agent, or Firm* — Andrew Morabito

(57) ABSTRACT

A fly fishing spinner holder comprising: a first releasable securing mechanism, a flexible tube having a first end and a second end, wherein the first end of the flexible tube is attached to the first releasable securing mechanism, a second releasable securing mechanism attached to the second end of the flexible tube, a spinner comprising a body having a first end and second end, wherein the first end has a receiving opening, a rotating head having an insertion end and an attachment end, wherein the insertion end is inserted into the receiving opening of the body, a dubbing spring attached to the attachment end of the rotating head, and the body is secured to the second releasable securing mechanism, and a stopping mechanism comprising a first portion attached to the second releasable securing mechanism, and a second portion attached to the rotating head.

14 Claims, 4 Drawing Sheets

ADJUSTABLE FLY LURE TYING APPARATUS

BACKGROUND OF THE INVENTION

The present invention relates to holding device for applying a packed spun dubbing loop and or rope to a hook, tube, or lure, and more particularly to a holding device that is flexible and has a locking mechanism.

Fly tying has existed for many years and has evolved in tying materials, tying tools, and tying techniques. There are different types of fly patterns and many of these patterns require tying materials at an axis that is perpendicular to the hook.

Fly tying is related to winding and fastening materials to a fishing hook, tube, or lure to create a fly-like bait or an artificial lure. A fly tying vise a popular tool for securing a fishing hook, tube, or lure for the fly tying process. Many different devices have been developed for use in tying feathers, hair, synthetics and other fly dressing materials to a fish hook. Several devices have been designed to allow for the tying of the dressing materials to the fish hook. However, these devices are either hand held which makes the process more difficult, are rigid and do not offer the ability to position the thread at a convenient angle, or lack the structural rigidity required to properly dub the hook.

Therefore, it is desired for a holding device that is movable and can be placed in a position that comfortable to each individual user, and has a locking mechanism so that when the dubbing loop/rope is being spun then being applied to the hook the user does not have to worry about the thread becoming unwound.

SUMMARY

Aspects of an embodiment of the present invention disclose an apparatus that addresses these difficulties in typing a fly-fishing lure. The invention has distinct features that consist of a clamp to allow attached of the holding device to a variety of surfaces. A flexible arm to allow for complete control of placement of the connection point. A locking device to hold the thread in place during and after the dubbing process.

An embodiment of the present invention includes a fly fishing lure dubbing loop spinner holding device comprising, a first releasable securing mechanism, a flexible tube having a first end and a second end, wherein the first end of the flexible tube is attached to the first releasable securing mechanism, a second releasable securing mechanism attached to the second end of the flexible tube, a spinner held in place by the second releasable securing mechanism, wherein the spinner has an attachment end, and a stopping mechanism comprising, a first portion attached to the second releasable securing mechanism, and a second portion attached to the portion of the spinner that is not held in place by the second releasable securing mechanism.

In a preferred embodiment, the fly fishing lure dubbing loop spinner holding device the first securing mechanism is a vice, the flexible tube is a gooseneck style tube, and the second securing mechanism is a spring clamp. The stopping mechanism is a hook and loop fastener with the first piece attached to the second securing mechanism and the second piece attached to the spinner that is held in the spring clamp.

DETAILED DESCRIPTION OF THE INVENTION

Figure 1:
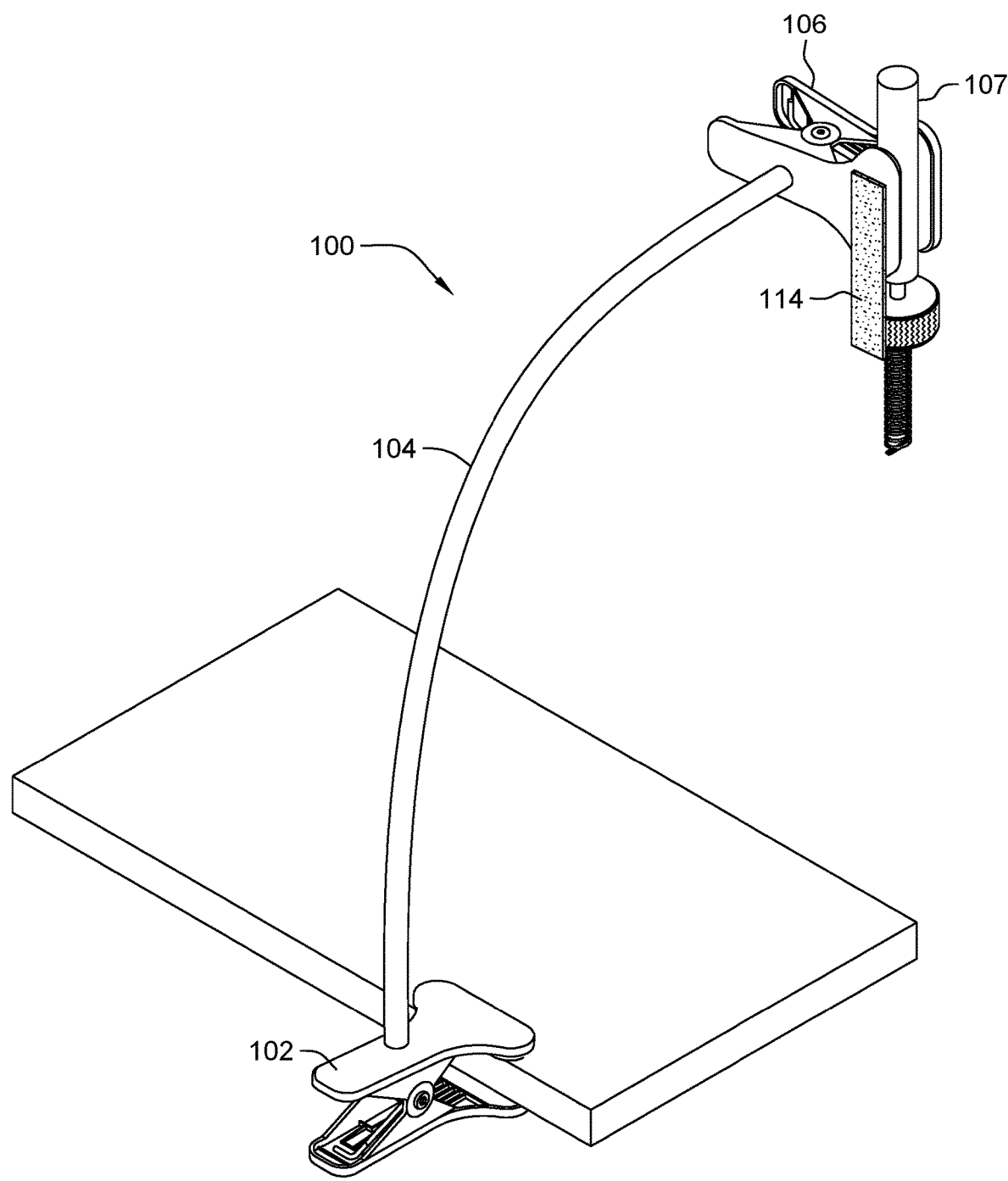
FIG. 1 depicts an isometric view of a fly tying device, in accordance with one embodiment of the present invention.

The products of the present invention provide a dubbing spinner that provides a more accessible method of dubbing a fly fishing lure. The device assists the person with a structured and stable working environment to create the lure, while also providing the adjustability to position the tools in a position and location that is most comfortable for each user. The device is designed to attach to various surfaces, and has a magnitude of possible positions to place the tools in so each person can select the most desired and ergonomic working position. The present invention is designed to allow the user to adjust the placement of the thread or loop that is attached to the hook, so that when the user is applying the dubbing, they have more freedom and control over the process.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. It is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, the preferred methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates which may need to be independently confirmed.

It must be noted that as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

FIG. 1 depicts an isometric view of a holding device 100, in accordance with one embodiment of the present invention. In the depicted embodiment, the holding device 100 is comprised of a bench lock 102, a flexible arm 104, a spinner holder 106, a spinner 107, and a spinner lock 114.

The bench lock 102 secures the holding device 100 to a surface or structure so as to provide a stable base for the person to use while creating the fly fishing lures. The bench lock 102 can secure to, for example a table, bench, vise, ledge, wall, or other surface or structure that the person desires. In the depicted embodiment, the bench lock 102 is a spring-loaded clamp that is attached to the edge of the bench. In additional embodiments, a vise, bar clamp, tie down, removable adhesive strips, magnet, suction cups, multi-clamps, rail clamps, or other means to secure the holding device 100 to a surface. In additional embodiments, the bench lock 102 may be a permanently affixed to the bench.

The flexible arm 104 provides the person with the adjustability and movability to position the spinner holder 106 in the person's desired position to most comfortably construct the fly fishing lures. The flexible arm 104 is attached to the bench lock 102. In some embodiments, the flexible arm 104 is detachable from the bench lock 102. The flexible arm 104 is designed to provide the flexibility to angle and move the spinner 107 in substantially any and all directions and positions. This freedom to rotate and move the spinner 107 to any position allows the user to find the ideal and most comfortable position when creating the lures. The flexible arm 104 also provides the required structural rigidity to stay stationary after the desired position is found and during the creation of the lures. The flexible arm 104 is attached to the bench lock 102 in a location that provides adequate stability based on the type of bench lock 102 as well as the style of the flexible arm 104.

In the depicted embodiment, the flexible arm 104 is an articulatable tube, such as a gooseneck style tubing that is flexible. In another embodiment, the flexible arm 104 is an articulatable arm, such as an adjustable swing arm. In further embodiments, wherein the flexible arm 104 is an articulated arm, the arm is equipoised through the use of various counterweights or springs to assist in balancing the flexible arm 104. The flexible arm 104 can be various flexible, adjustable, articulatable shafts and arm designs. In some embodiments, the flexible arm 104 may be an adjustable swing arm with one or more adjustment joints.

The length and thickness of the flexible arm 104 is predetermined to provide the adjustability the user desires and the length necessary to extend over the surface the user is working on. For example, some spinners 107 may weigh more requiring a stiffer and stronger flexible arm 104. Additionally, if the user has to attach the bench lock a far distance from his work place, the flexible arm 104 will need an extended length.

The spinner holder 106 is designed to fit and secure a spinner 107 when placed within the spinner holder 106. The spinner holder 106 is attached to the flexible arm 104, and in some embodiments, may be detachable from the flexible arm 104. The spinner holder 106 is designed to securely grasp and hold the spinner 107 to allow the user to safely and comfortably use the spinner 107 without the spinner 107 becoming dislodged or unsecured from the spinner holder 106. The spinner holder 106 may have various sizes and shapes to allows the user to use various spinners 107. In the preferred embodiment, the spinner holder 106 can hold various spinners 107. In the depicted embodiment, the spinner holder 106 is a spring clamp. In additional embodiments, a vise, bar clamp, tie down, removable adhesive, magnets, suction cups, multi-clamps, rail clamps, or other means to secure the spinner 107 may be employed by the spinner holder 106. In additional embodiments, the spinner 107 and the spinner holder 106 are a unitary element and the spinner 107 is not removable from the spinner holder 106, but the assembly is removable from the flexible arm 104.

The spinner 107 is used by the user to secure one end of the thread that is attached to the hook and secure the thread in place so that the user can easily and conveniently rotate the thread while assembling the lure. The spinner 107 is used to provide the connection point for the thread, so that when the person is making the fly fishing lures, the thread is in tension while connected to the spinner hook 111 and the spinner head 110 is easily rotated or spun to create the dubbing effect, all while allowing the person to have control, and freedom throughout the process. By having the ability to position the spinner in a variety of positions and with the added ability to lock the manual spinner 107 in place, the person does not have to concern themselves with positioning the spinner 107 and can concentrate on the amount of hair, fur, or feathers and the location of the materials along the thread of the lure, while knowing the thread is in tension and they have complete control over the tension and rotation of the thread to achieve the desired results.

In some embodiments, the spinner holder 106 and the spinner 107 are a single element that is connected to the flexible arm 104.

Figure 2:
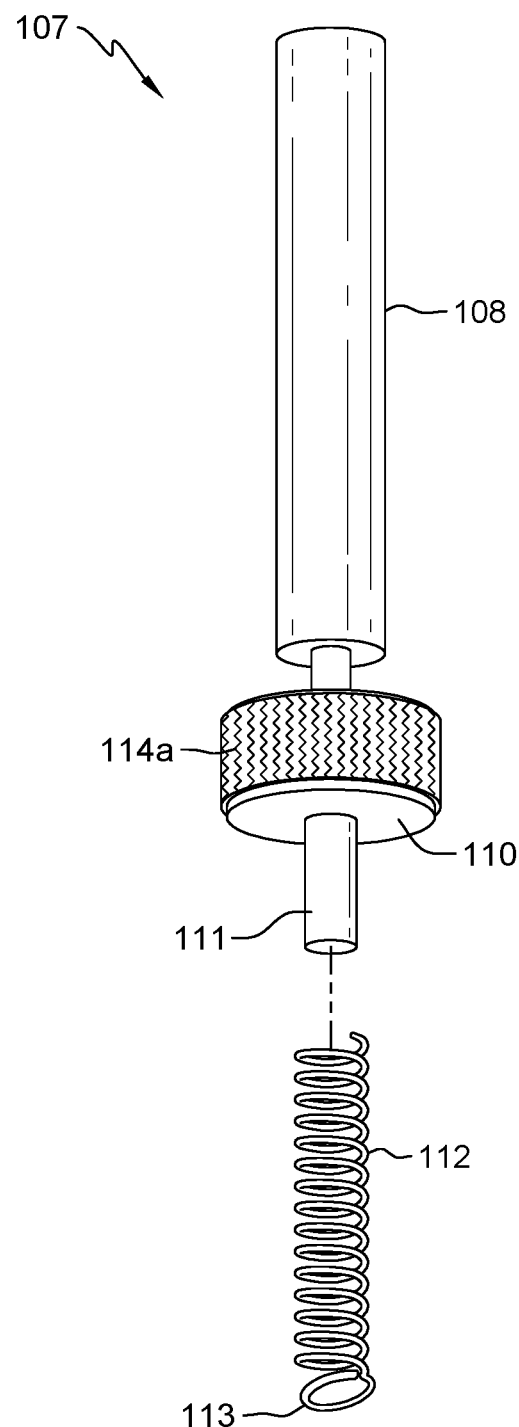
FIG. 2 depicts a close up view of the fly tying device in a locked position, in accordance with one embodiment of the present invention.

FIG. 2 depicts an isometric view of the spinner 107, in accordance with one embodiment of the present invention. In the depicted embodiment, the spinner 107 is comprised of a spinner body 108, a spinner head 110, the spring attachment 111, the spinner lock 114a and the dubbing spring 112. In various embodiments, many different variations of spinners 107 may be used. The spinner 107 may be various designed or styles of spinners 107 such as mechanical or electrical spinners 107. For example, in some embodiments, the spinner 107 is an electrical spinner and does not require the spinner lock 114a because the internal motor will act as the rotational locking mechanism while the device is not powered.

The spinner body 108 is designed to fit within the spinner holder 106 and remain in place during the assembly process of the lure. The spinner body 108 provides adequate length to allow the spinner holder 106 to be secured to the spinner body 108 and not to interfere with the rotation of the spinner head 110. In some embodiments, the spinner body 108 and the spinner head 110 come as a preassembled element. In some embodiments, the end of the spinner body 108 has a receiving opening which the spinner head 110 will securely fit within or attached to. When the spinner head 110 is attached to the spinner body 108, the rotational means are not affected by this connection. The ability to attached and detach the spinner head 110 from the spinner body 108 allows for the person to use various spinner heads 110. The receiving opening, may attached to the spinner head 110 via various means, such as locking pins, couplings, quick connect couplers, pressure fittings, screw style locks, or the like.

The spinner head 110 provides the rotation means to twist the thread. In one embodiment, the spinner head 110 is able to rotate freely in one or both directions to allow the user the ability to easily and quickly wind and unwind the thread. The spinner head 110 contains a rotational mechanism to accomplish this free rotation and is independent of the portion of the spinner head 110 that is secured to the spinner body 108. This rotational mechanism can be created by an internal ball bearing or the spinner head 110 may be a disk that is freely attached to a center shaft that attached to the spinner body 108. In some embodiments, the spinner head 110 has an integrated ratchet mechanism or unidirectional rotational mechanism to allow for movement in one direction that has a locking feature, to assist in forcing the spinner head 110 from unwinding the thread. In additional embodiments, the ratchet mechanism or the locking mechanism may have a release or brake to allow for rotation in the opposite direction if the user desired. In the depicted embodiment, the spinner head 110 is shown with the spinner lock 114a attached. This spinner lock 114a is used to secure the spinner head 110 if no internal locking mechanism is employed. The spinner lock 114a mates with the spinner lock 114b attached to the spinner holder 106 to secure the spinner head 110 from rotating. In additional embodiments, various portions or parts of the spinner head 106 may have the spinner lock 114a attached to it.

A spring attachment 111 is attached to the spinner head 110 to create a mounting point for the dubbing spring 112. The spring attachment 111 is based on the size and diameter of the dubbing spring 112. The spring attachment 111 provides a point to secure the dubbing spring 112 to the spinner 107 so that the dubbing spring 112 remains affixed to the spinner head 110 while the user is making the lures. The dubbing spring 112 may be affixed to the spring attachment 111 by a locking mechanism such as adhesive, a locking pin, a clamp, or the like. This locking mechanism maintains that the dubbing spring 112 rotates in unison with the spinner head 110.

The dubbing spring 112 is used to provide additional tension in the thread while the user is working on the lure. With the flexible arm 104 the user can position the device in the most idea position to work on the lure. However, as the user is working on the finer details of the lure and the thread is twisted the length of the thread will shift and adjust based on the amount of fur or materials added and the amount the thread is twisted. The dubbing spring 112 provides the minute adjustment while the user is creating the lure and providing the correct amount of tension so as to not break the thread, but not leave any excess slack in the thread as well. This creates a continuous tension in the thread so that the user does not have to constantly be adjusting the flexible arm 104 to adjust for this minute change in tension. The dubbing spring 112 may be secured to the spinner head 110 and they are a single element. In the depicted embodiment, the dubbing spring 112 is attached to the spinner hook 111 and the other end is attached to the thread. The end of the dubbing spring 112 has a closed loop 113 so the thread can be securely attached and/or tied to the dubbing spring 112 so that the thread does not come detached from the dubbing spring 112. In some embodiments, the closed loop 113 may be an offset hook, a half hook, a double loop, a coned end, a threaded plug, a round hook, a v hook, or the like. The length of the dubbing spring 112 and the spring constant are predetermined based on the intended use of the holding device 100. The dubbing spring 112 may have a constant pitch design, an hour glass design, a variable pitch design, a barrel design, a conical design or other designs depending upon the varies types of fly fishing lures which the person may wish to make.

Figure 3:
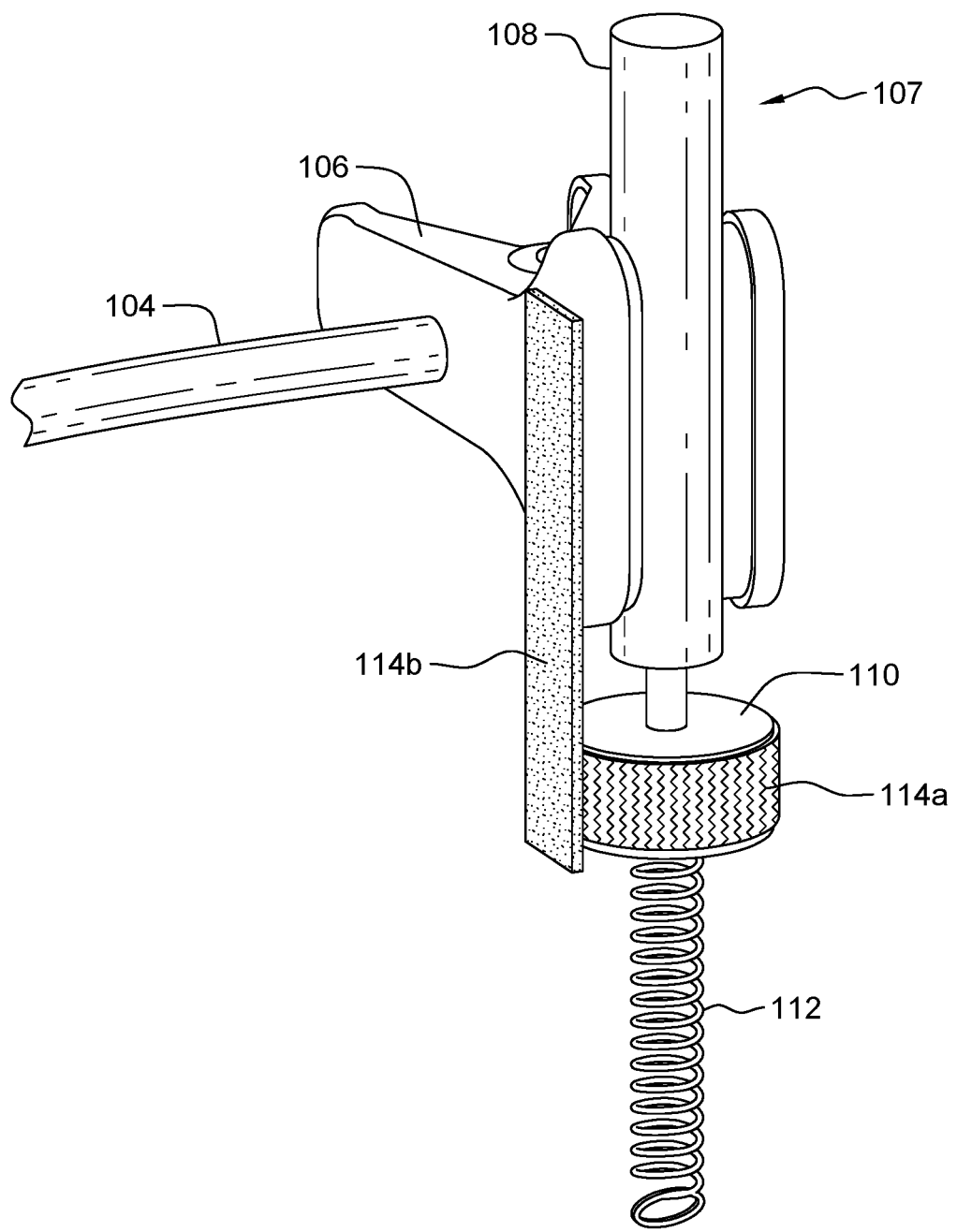
FIG. 3 depicts a close up view of the fly tying device in an unlocked position, in accordance with one embodiment of the present invention.
Figure 4:
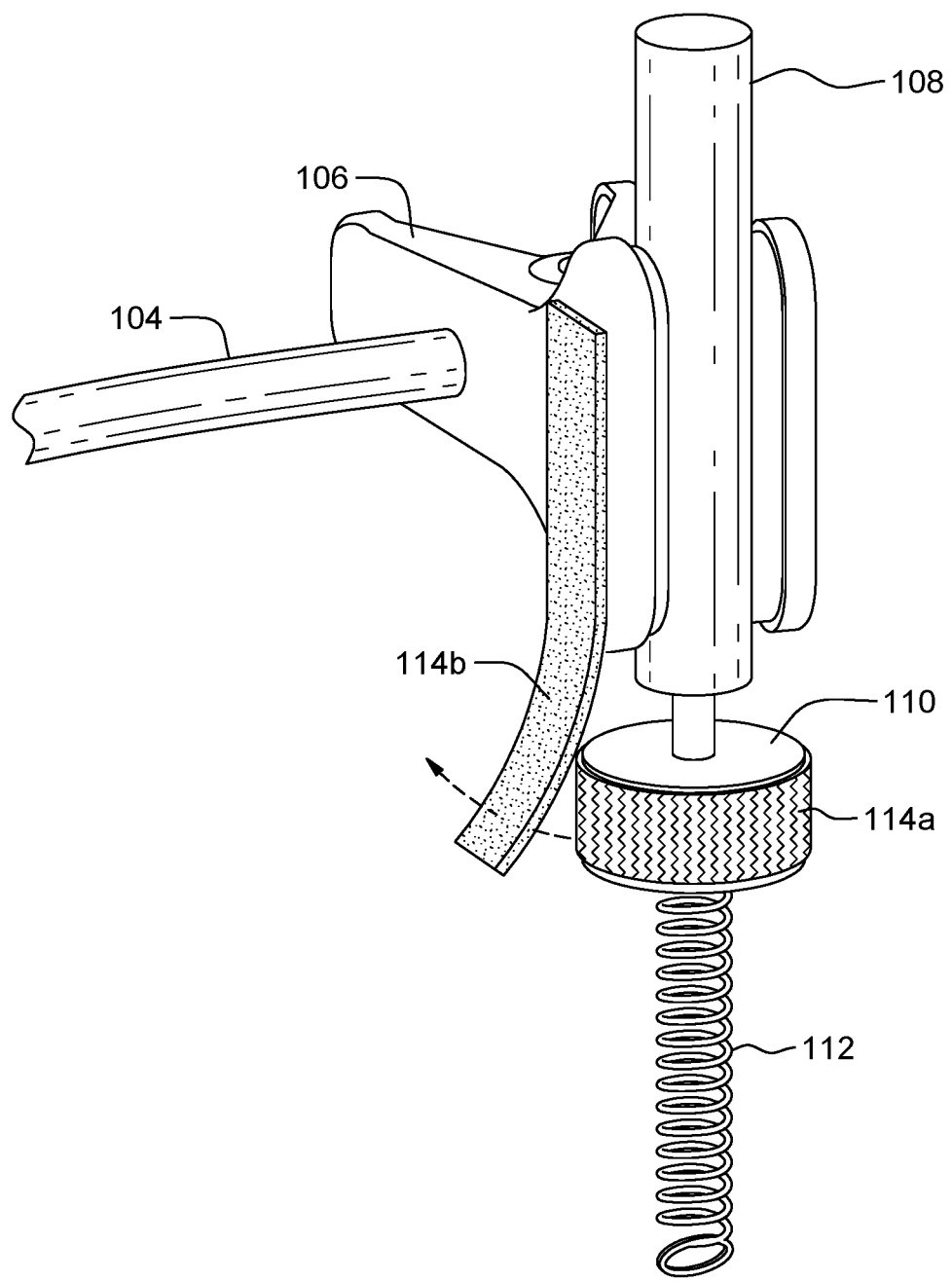
FIG. 4 depicts a view of the fly tying device with a lure installed, in accordance with one embodiment of the present invention.

FIGS. 3 and 4 depict detailed views of the of the spinner holder 106 and a spinner 107, in accordance with one embodiment of the present invention. The depicted embodiments, show the spinner lock 114 engaged with the spinner head 110 and the spinner lock 114 disengaged from the spinner head 110 to allow for the spinner head 110 to rotate freely. In the depicted embodiment, the spinner lock 114 is engaged, thereby keeping the spinner head 110 in a locked position. This locked position keeps the spinner head 110 from rotating. In additional embodiments, the spinner lock 114 may be internal or located on various parts of the spinner head 110 and the spinner holder 106. The spinner lock 114 is designed so that even when the spinner lock 114 is engaged, it does not interfere with the flexibility of the flexible arm 104. The user can continuously adjust the positioning of the device in the locked or unlocked positions of the spinner lock 114.

This locking feature allows the user to work on the lure with both hands free and not have to continuously hold the spinner head 110 in place. The rotational lock is used to keep the spinner head 110 from unwinding the thread. In the depicted embodiment, the spinner lock 114 is a first portion 114a and a second portion 114b of a hook and loop fastener which is attached to the spinner holder 106 and the spinner head 110. In additional embodiments, various other forms of locking mechanism may be employed to externally lock the spinner head 110.

This is a major improvement over the current design that requires the user to always hold the spinner head 110 in place. Now the user is free to use both hands to work on the lure knowing the spinner head 110 will not unravel. The rotational lock 114 may but not limited to, a hook and loop fastener, a snap button, a clip, a toggle, hook and eye fastener, a button, a latch, a clamp, a tie down, a pin, a magnet, or the like.

In embodiments, where an electric spinner 107 is used. The rotational lock 114 may still be used to lock the spinner 107 in place if the electric spinner 107 does not have an internal lock.

While this invention has been described in conjunction with the specific embodiments outlined above, it is evident that many alternatives, modifications and variations will be apparent to those skilled in the art. Accordingly, the preferred embodiments of the invention, as set forth above, are intended to be illustrative, not limiting. Various changes may be made without departing from the spirit and scope of this invention.

What is claimed is:

1. A fly fishing spinner holder comprising:
   a first releasable securing mechanism;
   a flexible tube having a first end and a second end, wherein the first end of the flexible tube is attached to the first releasable securing mechanism;
   a second releasable securing mechanism attached to the second end of the flexible tube;
   a spinner comprising:
     a body having a first end and second end, wherein the first end has a receiving opening,
     a rotating head having an insertion end and an attachment end, wherein the insertion end is inserted into the receiving opening of the body,
     an exposed tension spring having a securement end and an receiving end, wherein the securement end is attached to the attachment end of the rotating head, and the receiving end of the exposed tension spring is attached in contact with a thread; and
     the body is secured to the second releasable securing mechanism; and
   a stopping mechanism comprising;
     a first portion attached to the second releasable securing mechanism, and
     a second portion attached to the rotating head.

2. The fly fishing spinner holder of claim 1, wherein the first releasable securing mechanism is a clamp.

3. The fly fishing spinner holder of claim 1, wherein the stopping mechanism is a hook and loop fastener.

4. The fly fishing spinner holder of claim 1, wherein the spinner has a power supply and is electronically controlled.

5. The fly fishing spinner holder of claim 1, wherein the flexible tube is a gooseneck style tubing.

6. The fly fishing spinner holder of claim 1, wherein the spinner is attached directly to the flexible tube.

7. The fly fishing spinner holder of claim 1, wherein the first releasable securing mechanism is a vise clamp.

8. The fly fishing spinner holder of claim 1, wherein the second releasable securing mechanism is a spring clamp.

9. The fly fishing spinner holder comprising:
a first releasable securing mechanism;
a flexible tube having a first end and a second end, wherein the first end of the flexible tube is attached to the first releasable securing mechanism;
a second releasable securing mechanism attached to the second end of the flexible tube;
a spinner secured within the second releasable securing mechanism comprising;
a body having a receiving end,
a rotating spinner head inserted into the receiving end of the body, wherein the rotating spinner head can rotate freely,
an engageable stopping mechanism attached to the rotating spinner head, and
an exposed spring having a first end and a second end and the first end of the exposed spring is attached to the rotating spinner head and the second end of the exposed spring is directly attached to a thread, for keeping the thread taught while connected to the second end, wherein the flexible spring is attached to the rotating spinner head at a first end, and wherein the second end has a thread attachment mechanism to directly attached to the thread.

10. The fly fishing spinner holder of claim 9, wherein the rotating spinner head has a unidirectional rotation.

11. The fly fishing spinner holder of claim 9, wherein the engageable stopping mechanism is integrated into the rotating spinner head.

12. The fly fishing spinner holder of claim 9, wherein engageable stopping mechanism is a ratchet style mechanism.

13. The fly fishing spinner holder of claim 9, wherein the spinner and the second securing mechanism are a unitary element.

14. The fly fishing spinner holder of claim 9, wherein the second end of the flexible spring is exposed.

* * * * *